US009446772B2

(12) United States Patent
Lovett et al.

(10) Patent No.: US 9,446,772 B2
(45) Date of Patent: Sep. 20, 2016

(54) METHOD AND ASSEMBLY FOR REDUCING ENERGY CONSUMPTION OF AN ELECTRIFIED VEHICLE

(71) Applicant: FORD GLOBAL TECHNOLOGIES, LLC, Dearborn, MI (US)

(72) Inventors: Karin Lovett, Novi, MI (US); Angel Fernando Porras, Dearborn, MI (US); Christopher Adam Ochocinski, Canton, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/514,452

(22) Filed: Oct. 15, 2014

(65) Prior Publication Data

US 2016/0107656 A1  Apr. 21, 2016

(51) Int. Cl.
*B60W 50/10* (2012.01)
*B60L 11/18* (2006.01)
*B60W 50/14* (2012.01)
*B60H 1/00* (2006.01)

(52) U.S. Cl.
CPC .......... *B60W 50/10* (2013.01); *B60H 1/00735* (2013.01); *B60L 11/187* (2013.01); *B60W 50/14* (2013.01)

(58) Field of Classification Search
None
See application file for complete search history.

(56) References Cited

U.S. PATENT DOCUMENTS

| 8,118,237 B2 | 2/2012 | Vyas et al. |
| 8,620,506 B2 | 12/2013 | Kummer et al. |
| 2003/0183184 A1 | 10/2003 | Murray et al. |
| 2005/0274705 A1* | 12/2005 | Zhu ........................ B60L 3/0046 219/202 |
| 2007/0193792 A1* | 8/2007 | Yamaguchi ............ B60H 1/004 180/65.225 |
| 2009/0071178 A1 | 3/2009 | Major et al. |
| 2011/0153140 A1 | 6/2011 | Datta et al. |
| 2013/0079978 A1* | 3/2013 | Uyeki ................ B60H 1/00657 701/36 |
| 2013/0342365 A1* | 12/2013 | Kiefer .................... B60Q 9/008 340/901 |

* cited by examiner

*Primary Examiner* — Mussa A Shaawat
*Assistant Examiner* — Kyung Kim
(74) *Attorney, Agent, or Firm* — Carlson, Gaskey & Olds, P.C.

(57) ABSTRACT

An exemplary method includes changing a scheduled preconditioning cycle of an electrified vehicle in response to a period without a key cycle of the electrified vehicle. Another exemplary method includes communicating an alert to an operator of an electrified vehicle in response to at least one preconditioning cycle of the electrified vehicle without a key cycle of the electrified vehicle.

20 Claims, 3 Drawing Sheets

METHOD AND ASSEMBLY FOR REDUCING ENERGY CONSUMPTION OF AN ELECTRIFIED VEHICLE

TECHNICAL FIELD

This disclosure is directed toward reducing an electrified vehicle's energy consumption, particularly energy consumption from a source external to the vehicle.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electrified vehicles (HEVs), plug-in hybrid electrified vehicles (PHEVs), fuel cell vehicles, and battery electrified vehicles (BEVs). A powertrain of an electrified vehicle is typically equipped with a battery pack having battery cells that store electrical power for powering the electric machine. The battery cells may be charged prior to use. The battery cells may be recharged during a drive via regenerative braking or the internal combustion engine.

When parked, some electrified vehicles, such as plug-in hybrid electric vehicles or battery electric vehicles, may connect to an external source of energy to recharge the battery. Energy can also be drawn from the external source to precondition the electrified vehicle. A preconditioning cycle prepares the vehicle for a drive cycle.

SUMMARY

A method according to an exemplary aspect of the present disclosure includes, among other things, changing a scheduled preconditioning cycle of an electrified vehicle in response to a period without a key cycle of the electrified vehicle.

In another example of the foregoing method, the changing comprises canceling the scheduled preconditioning cycle.

In another example of any of the foregoing methods, the changing comprises placing the electrified vehicle in an extended park mode.

In another example of any of the foregoing methods, the method further comprises alerting a user in response to the period without a key cycle prior to the changing.

In another example of any of the foregoing methods, the method comprises automatically placing the electrified vehicle in an extended park mode if a threshold amount of time has passed after the alerting.

In another example of any of the foregoing methods, the preconditioning cycle comprises preconditioning a vehicle battery, a vehicle cabin, or both.

In another example of any of the foregoing methods, the method further comprises maintaining a battery temperature after the changing.

In another example of any of the foregoing methods, the period is a time period that is greater than 72 hours.

In another example of any of the foregoing methods, the method further comprises waking the vehicle and starting a preconditioning cycle prior to the changing.

In another example of any of the foregoing methods, the method further comprises waking the vehicle and starting a cabin or battery preconditioning cycle prior to a customer schedule next usage time.

In another example of any of the foregoing methods, the method further comprises powering the preconditioning cycle using an energy source outside the vehicle.

In another example of any of the foregoing methods, the method further comprises receiving an input from the user to initiate the changing.

A method according to another exemplary aspect of the present disclosure includes, among other things, communicating an alert to an operator of an electrified vehicle in response to at least one preconditioning cycle of the electrified vehicle without a key cycle of the electrified vehicle.

In another example of the foregoing method, the method further comprises receiving an input from the operator in response to the alert, and discontinuing a scheduled preconditioning cycle in response to the input.

In another example of any of the foregoing methods, the method further comprises placing the electrified vehicle in an extended park mode in response to at least one preconditioning cycle without a key cycle of an electrified vehicle.

In another example of any of the foregoing methods, the communicating step is further in response to a time period without the key cycle of the electrified vehicle.

In another example of any of the foregoing methods, the time period is 72 hours or more.

In another example of any of the foregoing methods, the method further comprises powering the preconditioning cycle using a power source outside the vehicle.

An electrified vehicle assembly according to yet another exemplary aspect of the present disclosure includes, among other things, an electrified vehicle controller that selectively initiates a preconditioning cycle within an electrified vehicle, and a transmitter that communicates an alert to an operator of an electrified vehicle in response to at least one preconditioning cycle without a key cycle of an electrified vehicle.

In another example of the foregoing assembly, the controller discontinues the preconditioning cycle in response to a receiving an input from the operator in response to the alert.

In another example of the foregoing assembly, the assembly includes one or more heaters that heat a vehicle battery, a vehicle cabin, or both during the preconditioning cycle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Many electrified vehicles precondition to prepare for a drive cycle. A preconditioning cycle can draw energy from a source external to the electrified vehicle. This disclosure is directed toward changing scheduled preconditioning cycles to conserve energy.

Figure 1:
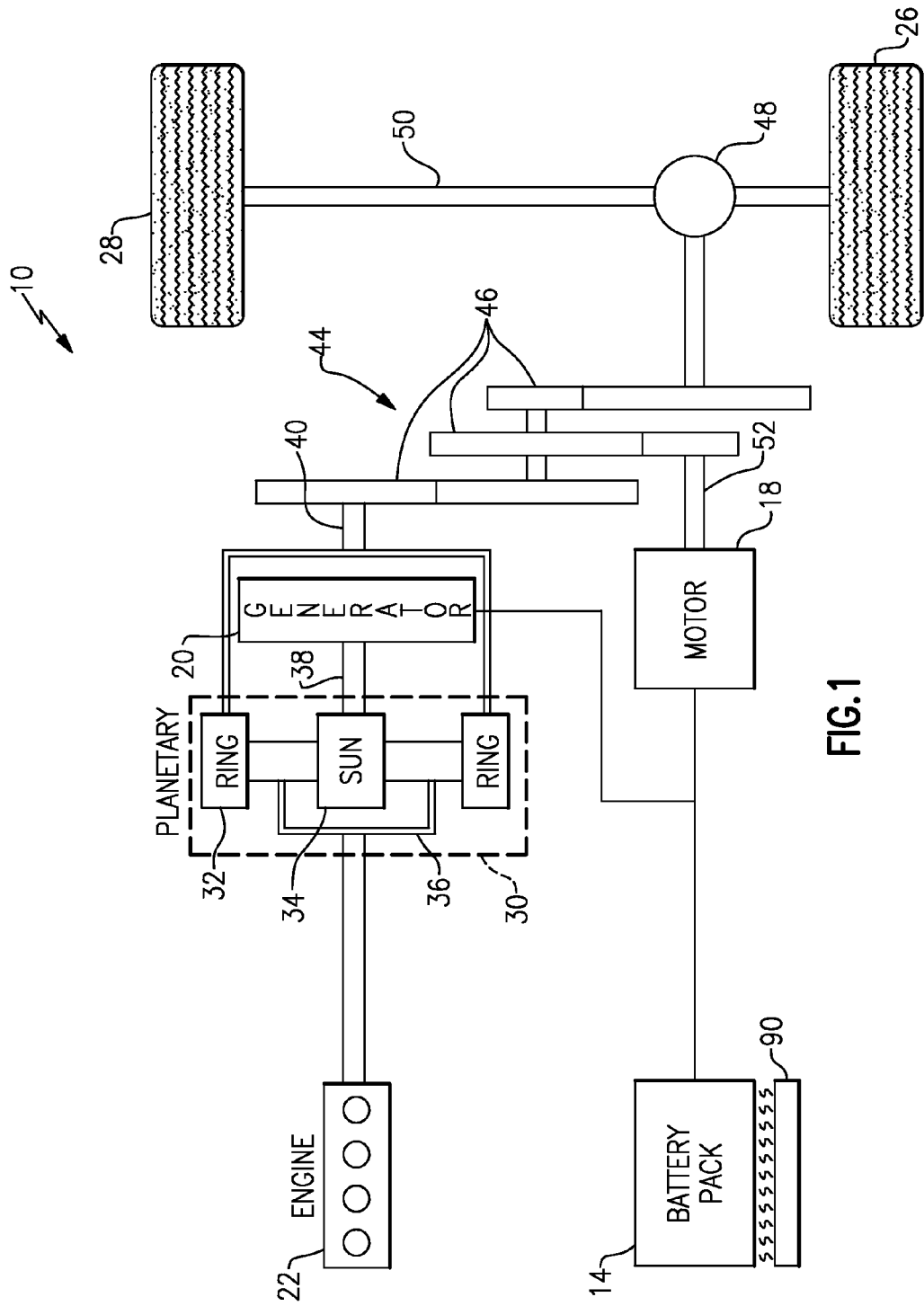
FIG. 1 illustrates a schematic view of an example powertrain.

Referring to FIG. 1, a powertrain 10 for a plug-in hybrid electric vehicle (PHEV) includes a battery pack 14, a motor 18, a generator 20, and an internal combustion engine 22.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems can both generate torque to drive one or more sets of vehicle wheels 26 of the electric vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle wheels 26. The differential 48 may include a plurality of gears that enable the transfer of torque to the vehicle wheels 26. In this example, the second power transfer unit 44 is mechanically coupled to an axle 50 through the differential 48 to distribute torque to the vehicle wheels 26.

The motor 18 can also be employed to drive the vehicle wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Figure 2:
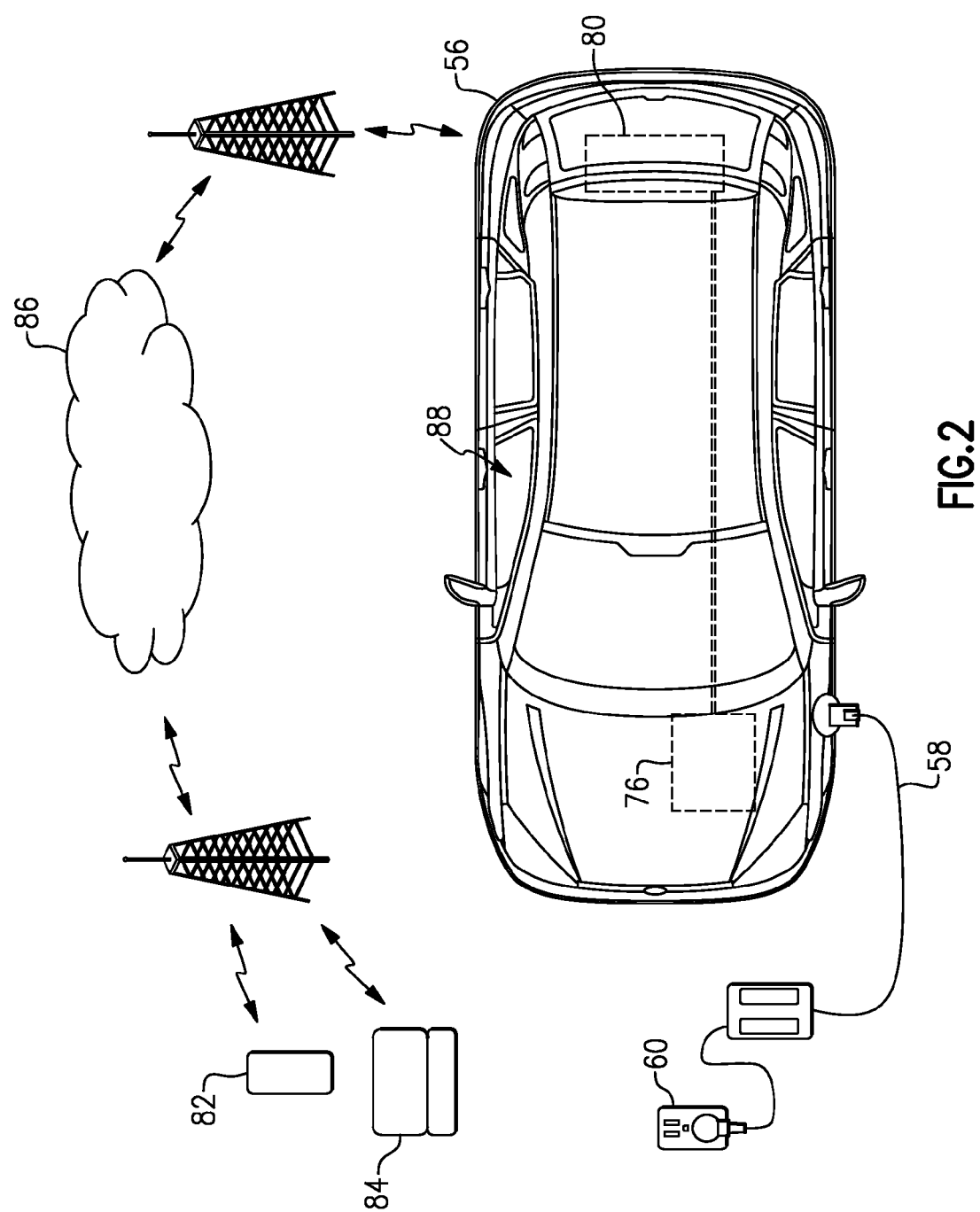
FIG. 2 illustrates a communication arrangement include an electrified vehicle having the powertrain of FIG. 1.

Referring now to FIG. 2 with continuing reference to FIG. 1, an example electrified vehicle 56 includes the powertrain 10. When parked, a charger 58 can couple the vehicle 56 to an energy source 60 that is external to the vehicle 56.

The example vehicle 56 further includes a controller 76 and a transmitter 80 operably coupled with the controller 76. The controller 76 may be a hybrid powertrain control module. The transmitter 80 may be a telematics control unit or another type of connectivity unit.

The example controller 76 can include a processor operatively linked to a memory portion. The example processor is programmed to execute a program stored in the memory portion. The program may be stored in the memory portion as software code.

The program stored in the memory portion may include one or more additional or separate programs, each of which includes an ordered listing of executable instructions for implementing logical functions.

The processor can be a custom made or commercially available processor, a central processing unit (CPU), an auxiliary processor among several processors associated with the controller 76, a semiconductor based microprocessor (in the form of a microchip or chip set) or generally any device for executing software instructions.

The memory portion can include any one or combination of volatile memory elements Moreover, the memory may incorporate electronic, magnetic, optical, and/or other types of storage media.

The transmitter 80 can communicate with devices, such as a cell phone 82 or a laptop computer 84. The devices may communicate directly with the transmitter 80 or may communicate with the transmitter 80 through a cloud infrastructure 86 as is shown. The cloud infrastructure 86 can be private, public, or some combination of these.

When the vehicle 56 is parked and the charger 58 is connecting the vehicle 56 to the energy source 60, the vehicle 56 can draw energy from the energy source 60 to recharge battery pack 14.

When the vehicle 56 is parked, the temperature of the battery pack 14 may need to be maintained within a particular range. Keeping the temperature of the battery pack 14 within the particular range can, for example, improve the life expectancy of the battery pack 14 or extend driving or operational range. The vehicle 56 can thus draw energy from the energy source 60 to heat or cool the battery pack 14 so that the battery pack 14 stays within a certain specified temperature range.

The vehicle 56 can additionally draw energy from the energy source 60 for a preconditioning cycle. Again, the preconditioning cycle prepares the vehicle 56 for a drive cycle. The preconditioning cycle can include, among other things, heating or cooling the battery pack 14, a vehicle cabin 88, the vehicle seats, the steering wheel, other touch points, transmission oil, engine coolant. The preconditioning cycle can further include defrosting the front, side, and rear mirrors. In some examples, preconditioning extends a potential range for the vehicle 56 to operate in electric mode at time of drive away by thermally conditioning directly or indirectly actuators that may suffer from extreme ambient conditions by using energy from the energy source 60 rather than from the vehicle.

The temperature of the battery pack 14 appropriate for beginning the drive cycle can differ from the current temperature of the battery pack 14. Thus the preconditioning cycle may require heating or cooling the battery pack 14 to a temperature or range of temperatures that is more specific than the temperature range appropriate for the battery pack 14 when the vehicle 56 is parked.

During one example preconditioning cycle, the vehicle 56 draws energy from the energy source 60 to power a heater 90 that heats the battery pack 14 to a temperature appropriate for beginning the drive cycle. The vehicle 56 may further contain another heater for heating the vehicle cabin 88. In other examples, a common heat loop could heat both the battery pack 14 and the vehicle cabin 88.

In some examples of the vehicle 56, an operator can schedule one or more preconditioning cycle start time (or "go-times.") For example, if the operator typically begins a drive cycle at 7:00 AM every day, the operator can schedule 7:00 AM as a daily go-time. The vehicle 56 then begins preconditioning cycle prior to 7:00 AM so that the preconditioning cycle completes just prior to 7:00 AM every day. The vehicle 56 may be programmed with one or more different go-times for each day.

The operator may use the communication devices or in-vehicle HMI devices to initiate a preconditioning cycle, or to establish one or more go-times for a preconditioning cycle. The go-times may be stored within the cloud infrastructure 86, within the vehicle 56, or both.

In some examples, the preconditioning cycle is discontinued if the vehicle 56 has not started a drive cycle within, say, fifteen minutes of the go time 72 hours. If a preconditioning cycle takes place without a drive cycle, the energy expended during the preconditioning cycle may not be required.

In some examples of the vehicle 56, the operator can optionally place the vehicle 56 in an extended park mode. The operator may interface directly with the vehicle 56 to enter the extended park mode, or may use one of the remote devices to enter the extended part mode.

When the vehicle 56 is in the extended park mode, scheduled preconditioning cycles are canceled, which can include canceling any on-plug thermal management and wake up vehicle related functions. Thus, saving the operator, among other things, the costs of energy associated with the unneeded preconditionings.

The operator may, for example, place the vehicle 56 in the extended park mode if the operator is vacationing and does not plan to drive the vehicle 56 at the go-times. The operator may interface directly with the vehicle 56 to exit the extended park mode, or may use one of the remote devices to exit the extended part mode.

If the operator neglects to place the vehicle 56 in the extended park mode, the vehicle 56 may continue to undergo unnecessary preconditioning cycles, which use power from the energy source 60. To reduce unnecessary preconditioning cycles, the example vehicle 56 recognizes when one or more preconditioning cycles have occurred without an associated drive cycle.

In some examples, the vehicle 56 may respond to one or more preconditioning cycles occurring without an associated drive cycle by communicating an alert to one or more of the remote devices. After receiving the alert, the operator can then cause the vehicle 56 to enter the extended park mode or otherwise cancel planned preconditioning cycles. The operator may execute these commands from one of the remote devices.

In some examples, the vehicle 56 may respond to one or more preconditioning cycles occurring without an associated drive cycle by automatically causing the vehicle 56 to enter the extended park mode or otherwise cancel planned preconditioning cycles.

In some examples, one or more preconditioning cycles without an associated drive cycle is not required to send an alert or cancel planned preconditioning cycles. Instead, the vehicle 56 sends the alert or cancels planned preconditioning cycles based on, for example, an amount of time that has passed since a drive cycle. For example, the vehicle 56 may wake for a preconditioning cycle and, prior to completing the preconditioning cycle, recognize that the vehicle 56 has not been driven in more than, say, 72 hours. The vehicle 56 then sends an alert or cancels planned preconditioning cycles in response to the passage of time without a drive cycle.

Figure 3:
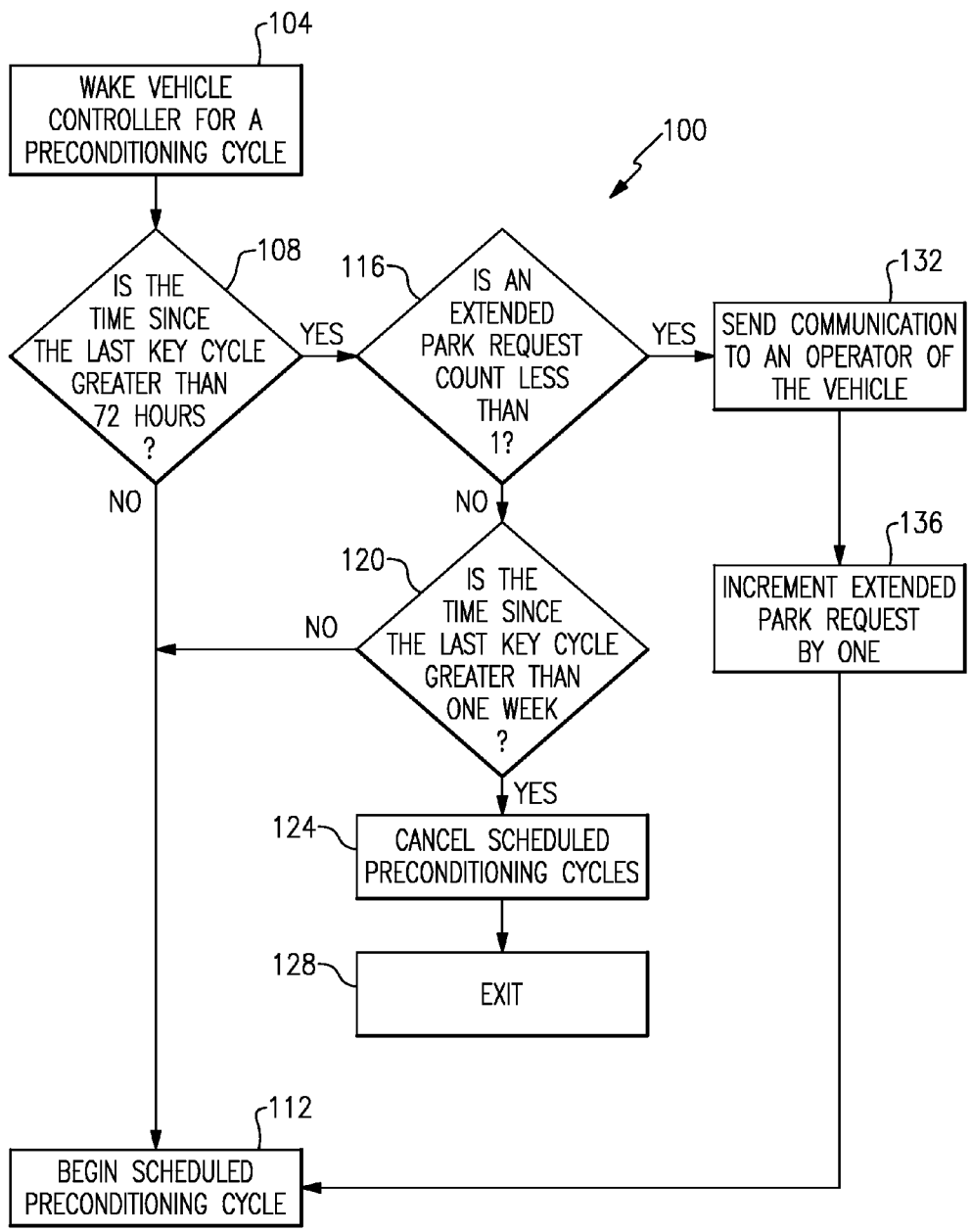
FIG. 3 illustrates the flow of an example method executed by a controller of the electrified vehicle of FIG. 2.

Referring to FIG. 3 with continuing reference to FIGS. 1 and 2, an example extended park request method 100 is executed on the processor of the controller 76 of the vehicle 56. In other examples, some or all of the method 100 is executed on other electrified vehicle controllers within the vehicle, other electrified vehicle controllers outside the vehicle, or both. The example method 100 is executed when the vehicle 56 is parked and the charger 58 is connecting the vehicle 56 to the energy source 60.

The method 100 includes a step 104 where the vehicle 56 wakes for a preconditioning cycle. Waking the vehicle 56 can be waking of the controller 76 in response to an internal timer, for example. The waking could be in response to a go-time.

At a step 108, the method 100 calculates whether the time since the last key cycle is greater than, for example, 72 hours. Time periods other than 72 hours could instead be used. The time periods can be calibrated. The step 108 could further require one or more previous preconditioning cycles without a key cycle.

In the example method 100, if a key cycle has occurred within the last 72 hours, the controller 76 exits the method 100 and begins a scheduled preconditioning cycle at a step 112. The key cycle represents the start of a drive cycle in this example.

If a key cycle has not been completed within the last 72 hours, the method 100 moves to a step 116 where the method 100 calculates whether an extended park request count is less than one. In this example, a communication to an operator of the vehicle requesting whether the operator wants to move the vehicle 56 to an extended park mode increases the extended park request count by one. An extended park request count less than one indicates that the extended park request has not been set by the controller. If request count is 1 at block 116 the operator of the vehicle 56 has received a request to place the vehicle in an extended park mode.

The step 116 is in place ensures that a single communication regarding moving the vehicle 56 to the extended park mode is sent. Values other than one in the step 116 could be used depending on maximum desired number of communications sent to the operator.

The controller 76 can include a counter to calculate the number of extended park requests sent to the operator. A key cycle of the vehicle 56 can reset the counter to zero.

If the number of extended park requests sent to the operator is one or more, the method 100 moves to a step 120 where the method 100 calculates whether the time since a completion of the last key cycle is greater than one week.

If the time is greater than one week in the step 120, the method 100 puts the vehicle automatically in extended park mode which cancels the preconditioning cycle at a step 124 and then exits the method 100 at step 128. If the time is not greater than one week in the step 120, the method 100 moves to the step 112 and begins the scheduled preconditioning cycle. The step 120 conserves energy by discontinuing preconditioning when it is clear that the vehicle 56 has been parked for an extended period of time. The one week time period can be adjusted to values other than one week. The time period can be calibratable.

Returning to the step 116, if the number of extended park requests sent to the operator is less than one, the method 100 moves to a step 132 where the method 100 sends an alert to the operator of the vehicle requesting whether the operator wants to move the vehicle to an extended park mode. The transmitter of the alert may be the transmitter 80, another transmitter outside the vehicle 56, or some combination of these.

The method 100 then increases the extended park request count by one at a step 136, and then exits the method at the step 112 and begins the preconditioning cycle.

As can be appreciated, if the operator responds to the request made in the step 132 and, for example, places the vehicle 56 in the extended park mode, the scheduled preconditioning cycle is changed. The changing of the scheduled preconditioning cycle is caused by the extended park mode stopping or not starting the scheduled preconditioning cycle.

In another example, rather than sending a communication to the operator, the method 100 changes a scheduled preconditioning cycle by canceling, automatically, any scheduled preconditioning cycles.

Notably, a key cycle can cause the controller 76 to exit the method 100 regardless the step. The method 100 then starts over when the vehicle 56 is parked and coupled to the energy source 60.

Although the example vehicle 56 is a PHEV, other types of electrified vehicles incorporate preconditioning cycles, such as BEVs. Such vehicles could benefit from the teachings of this disclosure, even those electrified vehicles that rely on power from a source within the vehicle for preconditioning rather than from a source external to the vehicle.

Notably, even if the method 100 results in the cancellation of scheduled preconditioning cycles, power may still be drawn from the energy source 60 to keep the temperature range battery pack 14 within an acceptable range for a parked vehicle.

Features of the disclosed examples include, among other things, saving the operator the cost of energy for preconditioning a vehicle when preconditioning is not required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   detecting, using a controller, a period without a key cycle of an electrified vehicle;
   communicating, using the controller, an alert to a user in response to the period; and
   in response to receiving an input from the user, changing a scheduled preconditioning cycle of the electrified vehicle in response to the period.

2. The method of claim 1, wherein the changing comprises canceling the scheduled preconditioning cycle.

3. The method of claim 1, wherein the changing further comprises placing the electrified vehicle in an extended park mode.

4. The method of claim 1, further comprising automatically placing the electrified vehicle in an extended park mode if a threshold amount of time has passed after the alerting.

5. The method of claim 1, wherein the scheduled preconditioning cycle is configured to precondition a vehicle battery, a vehicle cabin, or both.

6. The method of claim 1, further comprising maintaining a battery temperature after the changing.

7. The method of claim 1, wherein the period is a time period that is greater than 72 hours.

8. The method of claim 1, further comprising waking the vehicle and starting a preconditioning cycle prior to the changing.

9. The method of claim 8, further comprising powering the preconditioning cycle using an energy source outside the vehicle.

10. The method of claim 8, further comprising receiving an input from the user to initiate the changing.

11. The method of claim 1, wherein the alerting comprises communicating an alert to a device remote from the electrified vehicle.

12. A method, comprising:
    communicating, using a controller, an alert to an operator of an electrified vehicle in response to at least one preconditioning cycle of the electrified vehicle without a key cycle of the electrified vehicle;
    receiving an input from the operator in response to the alert; and
    discontinuing, using the controller, a scheduled preconditioning cycle in response to the input.

13. The method of claim 12, further comprising placing the electrified vehicle in an extended park mode in response to at least one preconditioning cycle without a key cycle of an electrified vehicle.

14. The method of claim 12, wherein the communicating is further in response to a time period without the key cycle of the electrified vehicle.

15. The method of claim 14, wherein the time period is 72 hours or more.

16. The method of claim 12, further comprising powering the at least one preconditioning cycle using a power source outside the vehicle.

17. The method of claim 12, wherein the communicating comprises communicating the alert to a remote device utilizing a cloud infrastructure.

18. An electrified vehicle assembly, comprising:
    an electrified vehicle controller that selectively initiates a preconditioning cycle within an electrified vehicle; and
    a transmitter that communicates an alert to an operator of an electrified vehicle in response to at least one preconditioning cycle without a key cycle of an electrified vehicle,
    wherein the controller discontinues the preconditioning cycle in response to receiving an input from the operator in response to the alert.

19. The electrified vehicle of claim 18, further comprising a heater that heats a vehicle battery, a vehicle cabin, or both during the preconditioning cycle.

20. The electrified vehicle of claim 18, further comprising a remote device receiving the alert communicated from the transmitter, the remote device remote from the electrified vehicle.

* * * * *